United States Patent [19]
Walton

[11] Patent Number: 5,289,800
[45] Date of Patent: Mar. 1, 1994

[54] WASTE ODOR ELIMINATOR COVER FOR A CAT WASTE BOX

[76] Inventor: Robert W. Walton, 4 Chapel Street South, Thorold, Ontario, Canada, L2V 3Y7

[21] Appl. No.: 31,274

[22] Filed: Mar. 15, 1993

Related U.S. Application Data

[63] Continuation-in-part of Ser. No. 793,126, Nov. 18, 1991, Pat. No. 5,193,488.

[51] Int. Cl.$^5$ ............................................. A01K 1/01
[52] U.S. Cl. ........................................ 119/166; 119/17; 119/165; D30/112
[58] Field of Search ................ 119/161–170, 119/15, 17, 19, 21; D30/108, 112, 119

[56] References Cited

U.S. PATENT DOCUMENTS

| | | | |
|---|---|---|---|
| 3,428,026 | 2/1969 | Schmers et al. | 119/17 |
| 3,752,120 | 8/1973 | Pallesi | 119/166 |
| 3,865,425 | 2/1975 | French | 119/19 |
| 5,129,364 | 7/1992 | Pirkie | 119/168 |
| 5,134,973 | 8/1992 | Sarullo | 119/165 |
| 5,136,980 | 8/1992 | Schoeber | 119/161 |
| 5,178,099 | 1/1993 | Lapps et al. | 119/161 |

*Primary Examiner*—John G. Weiss
*Attorney, Agent, or Firm*—Wallace F. Neyerlin

[57] ABSTRACT

Minimizing or eliminating the amount of odor-laden air that leaves a cat litter box and circulates into the room is accomplished by the mixing of the cooler room air with the hotter air that rises from the animal's fecal matter to the top of the box and then out through a series of charcoal filters.

This is achieved by having a dome cover (aesthetically or ornamentally designed to look like a bank) of approximately fourteen inches high, and twenty inches long by fifteen inches wide placed across the top of the litter box and/or removably fastened to same. The odor elimination or minimization starts with the cat's excretion of warm fecal matter in to the litter box or waste elimination system. As the warm, odor-laden air rises, it mixes in with the fresh cooler air entering into the dome cover from several (such as ten) designed slots on the outside of the dome cover.

This diluted air automatically reduces odor by expanding the air flow to the top of the enclosure. At the top of the dome cover the diluted air enters outlets that have charcoal filters therein, thereby purifying the air as it passes through the filters and into the general air in the room in which the litter box or waste elimination system is placed.

9 Claims, 4 Drawing Sheets

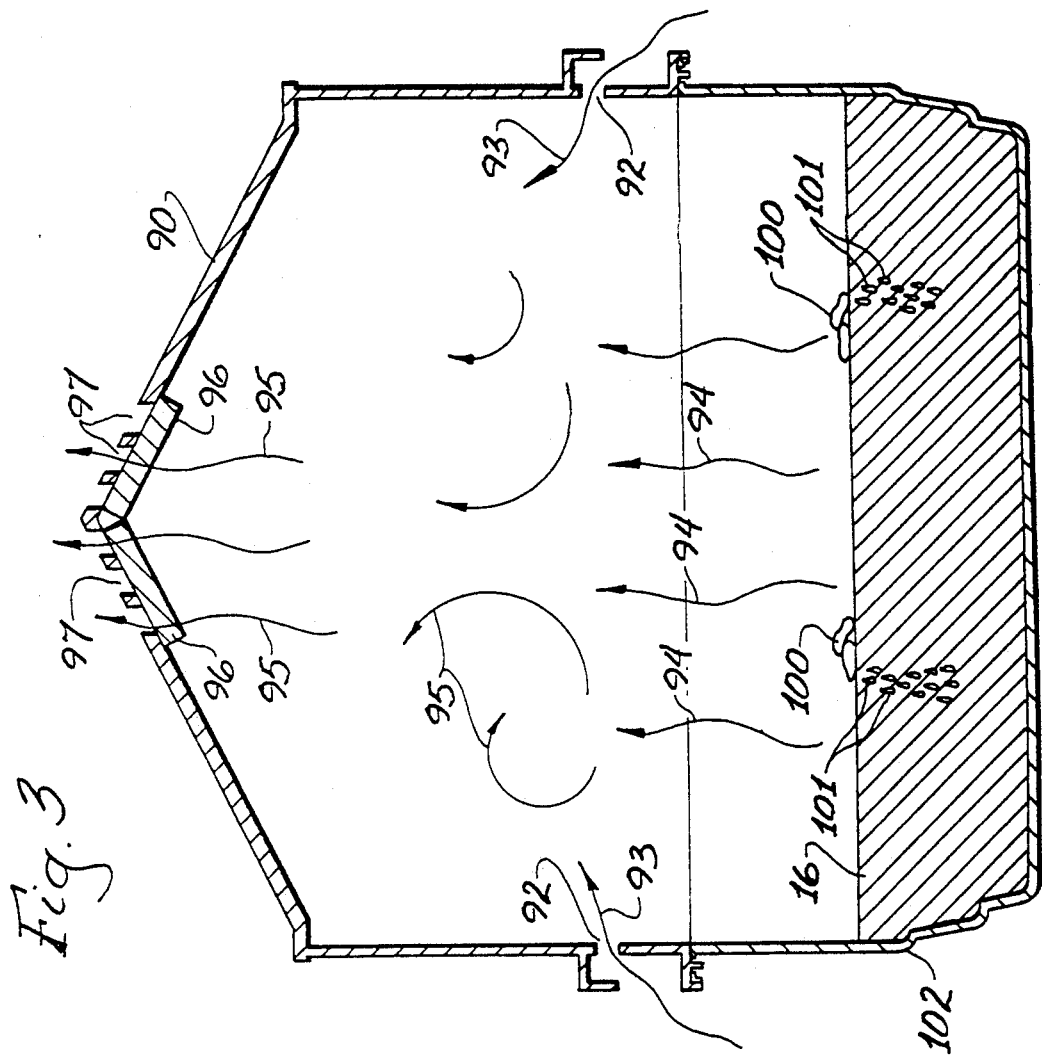
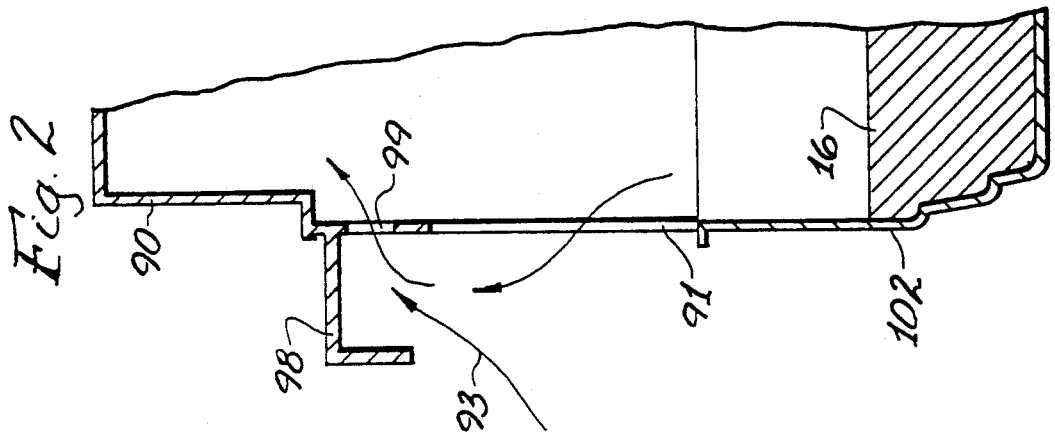

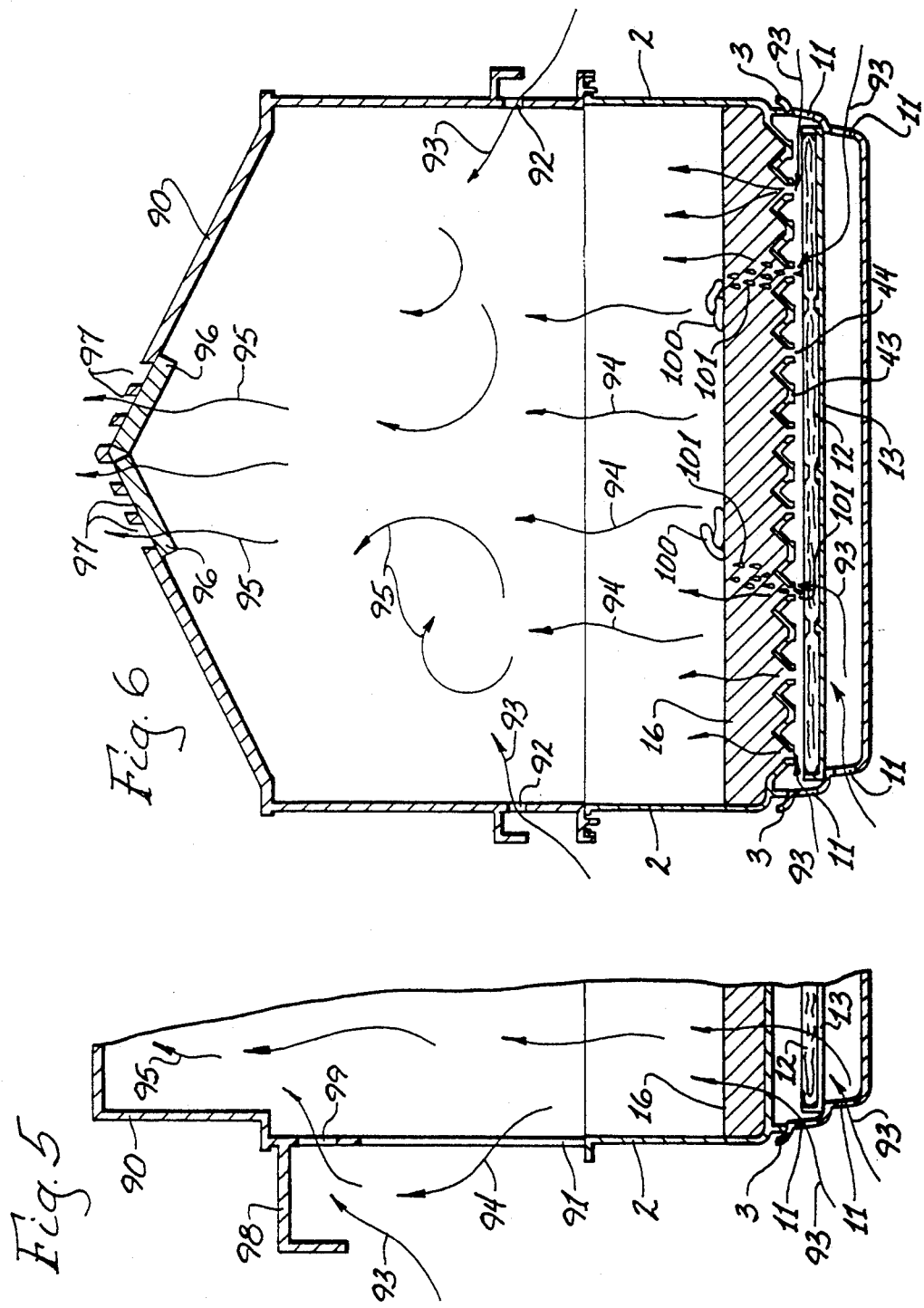

WASTE ODOR ELIMINATOR COVER FOR A CAT WASTE BOX

This application is a Continuation-in-Part of my prior Patent Application entitled: "Cat Waste Elimination System", Ser. No. 07/793,126, filed Nov. 18, 1991 and issued Mar. 16, 1993 as U.S. Pat. No. 5,193,488.

FIELD OF THE INVENTION

This invention relates to a means and device for substantially reducing fecal matter odors in a cat litter box and/or in a cat waste elimination system as described in my previous patent application referred to above.

BACKGROUND OF THE INVENTION

When a cat eliminates warm fecal matter into a litter box or cat waste elimination system, warm, odor laden air rises from it in the first 5 to 10 minutes of the animal's excretion before a crust forms on the outer shell of the fecal matter. The device of this invention is designed to minimize the amount of this odor-laden air that leaves the box and circulates into the general air in the room in which the box is placed.

SUMMARY OF THE INVENTION

Minimizing or eliminating the amount of odor-laden air that leaves the box and circulates into the room is accomplished by the mixing of the cooler room air with the hotter air that rises from the animal's fecal matter to the top of the box or waste elimination system and then out through a series of charcoal filters.

This is achieved by having a dome cover (aesthetically or ornamentally designed to look like a bank) of approximately fourteen inches high, and twenty inches long by fifteen inches wide placed across the top of the litter box and/or removably fastened to the system of my prior invention. The odor elimination or minimization starts with the cat's excretion of warm fecal matter into the litter box or waste elimination system. As the warm, odor-laden air rises, it mixes in with the fresh cooler air entering into the dome cover from several (such as ten) designed slots on the outside of the dome cover.

This diluted air automatically reduces odor by expanding the air flow to the top of the enclosure. At the top of the dome cover the diluted air enters outlets that have charcoal filters therein, thereby purifying the air as it passes through the filters and into the general air in the room in which the litter box or waste elimination system is placed.

In a preferred embodiment the dome cover also has a top or awning over the entrance to the litter box, which top or awning is designed to catch any air escaping through the entrance and to bring such air back into the main enclosure by a series of openings in the wall of the main unit but covered by the awning, i.e. the openings are in the bottom of the awning. Thereby the odor soaked polluted air re-enters the main chamber of the dome cover to mix with the cold air and be "blown out" through the charcoal filters. (This comes about through convection currents whereby the cooler air entering the dome cover forces the warmer air from the warm fecal matter to rise within the dome cover).

The present invention is now described in reference to the following drawings which illustrate the various details of my invention.

BRIEF DESCRIPTION OF THE DRAWINGS

FIG. 2 is a partial sectional view of the dome cover and litter box taken across line 2—2 of FIG. 1;

FIG. 3 is a sectional view of the dome cover and litter box taken across line 3—3 of FIG. 1;

FIG. 5 is a partial sectional view of the dome cover and elimination system of FIG. 4 taken across cut-line 5—5 of FIG. 4; and FIG. 6 is a sectional view of the dome cover and cat waste elimination system of FIG. 4 taken across cut-line 5—5 of FIG. 4.

DETAILED DESCRIPTION OF THE DRAWINGS

Figure 1:
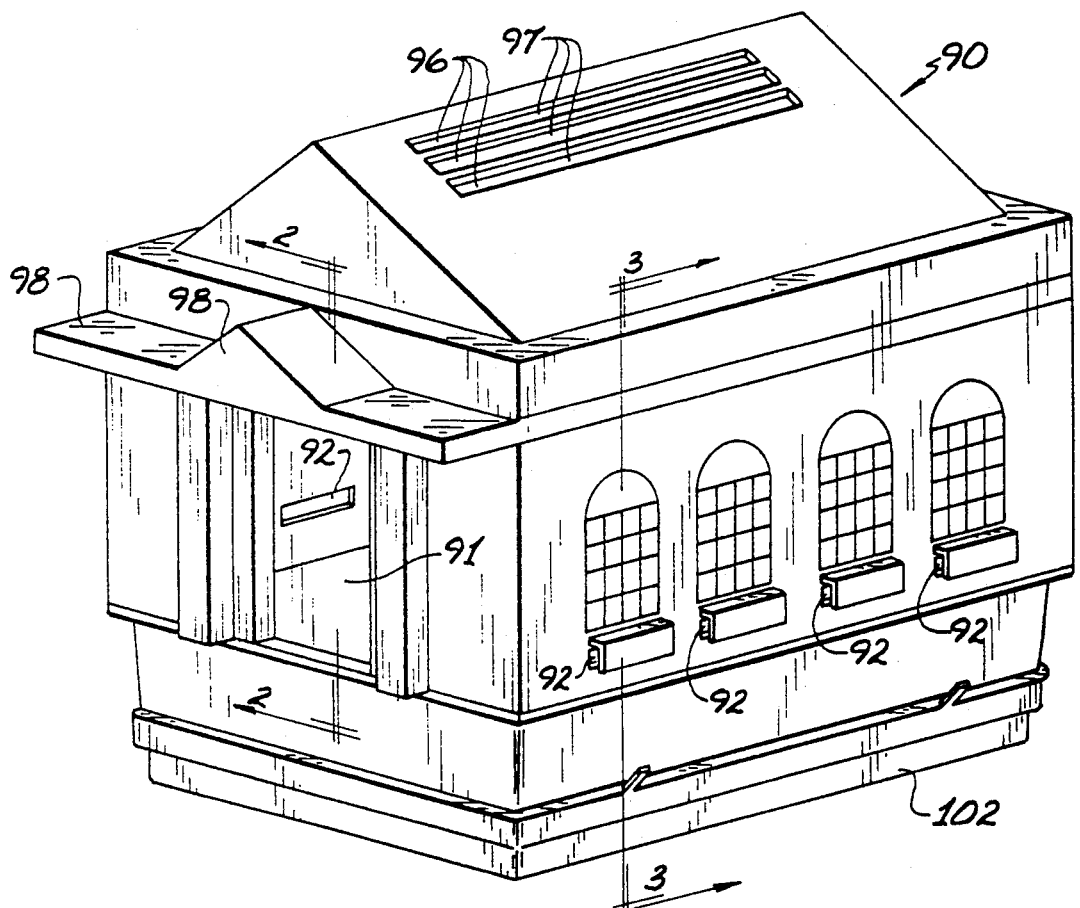
FIG. 1 is a perspective view of the dome cover or enclosure of the present invention positioned atop a standard type litter box.

In FIG. 1 numeral 90 denotes the dome cover for the litter box. (Facetiously the top of the cover is referred to as the "Gold Dome"; the entire cover, which has an ornamental design like a bank is referred to as the "Royal Feline Bank" with the slogan "All Deposits Welcome"). Numeral 91 designates the entryway to the device. Numeral 92 designates the numerous air entrance slots, preferably about ten in number, four on each side and two in the back of the cover.

Numeral 96 in this Figure designates charcoal filters, typically two or more in number; numeral 97 designates air exit slots; numeral 98 designates an awning-like cover over the entryway; and numeral 102 designates what may be referred to as a standard litter box atop the edges or perimeter of which the "bank" cover of the present invention is adapted to be placed.

In FIGS. 2–6, the numerals set forth above refer to the same items. FIG. 2 also illustrates cool fresh air 93 entering through an opening 99 underneath the awning-like cover 98. This figure also illustrates the convection currents whereby the odor-laden air that is about to leave the litter box is swept back into same by the cool, fresh air 93 through the opening 99 and thence back toward the charcoal filters 96 in the top of the dome cover before leaving the dome cover through the openings or air exit slots 97 in the top of the dome cover.

In FIGS. 2 and 3, numeral 16 designates a gravel like material such as the various cat litter products which are generally on the market. In FIG. 3, numeral 94 designates warm, moist air emanating from the cat's fecal matter 100 and/or from the cat's urine 101; and numeral 95 designates mixed air from the combination of the odor-laden air 94 and the fresh air 93 entering into the "bank" cover through the various air entrance slots 92.

Figure 4:
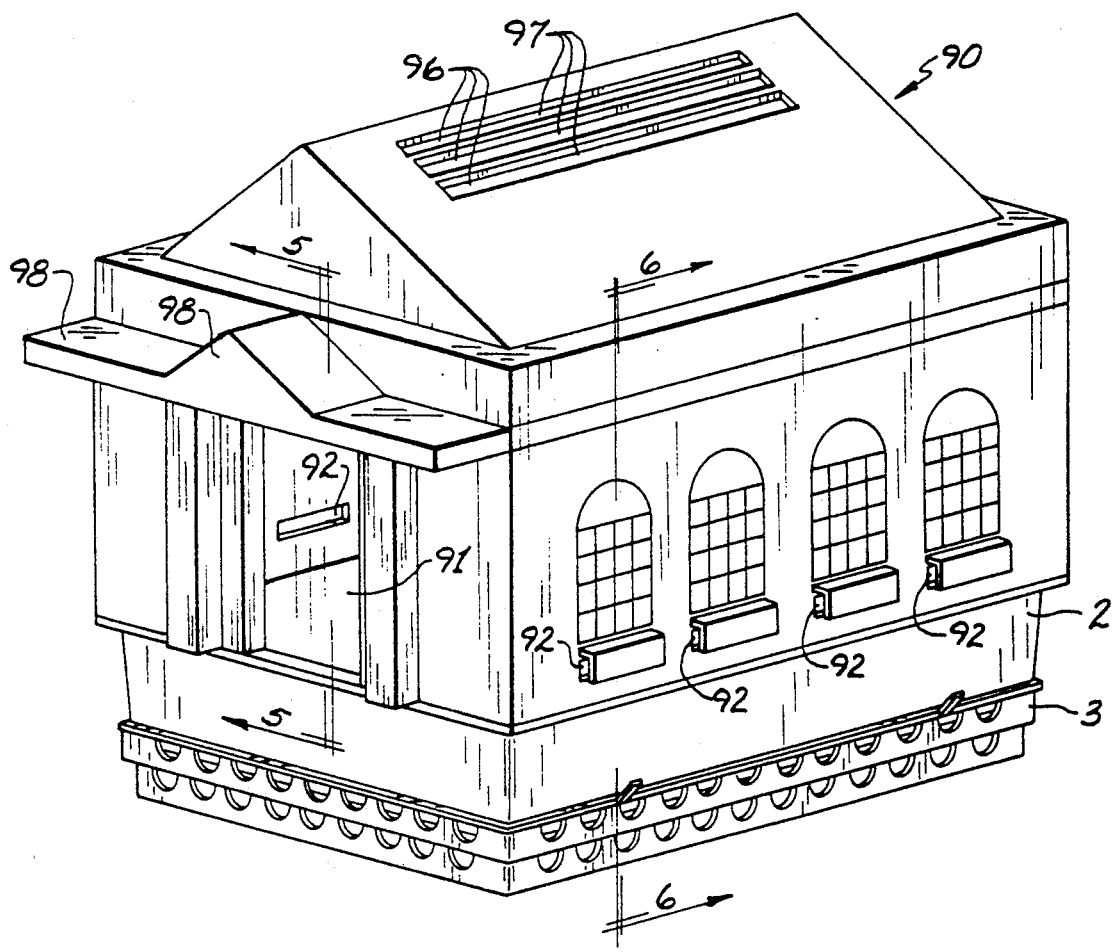
FIG. 4 is a perspective view of the dome cover of the present invention positioned atop the preferred embodiment of the cat waste elimination system of my previous patent application Ser. No. 07/793,126 referred to above.

Reference is now drawn to FIGS. 4–6 which illustrate the combination of the dome cover of the present invention with the cat waste elimination system of my previous patent application referred to above.

In FIGS. 4, 5 and 6, numeral 2 denotes the upper compartment of the cat waste elimination system and numeral 3 denotes the lower tray assembly.

In FIGS. 5 and 6, numeral 11 denotes the aeration holes in the lower tray assembly of my prior invention, numeral 12 denotes the liner pad or tablet, numeral 13 denotes the tray supporting the liner pad, numeral 43 denotes the bar separators in the bottom of the upper compartment and numeral 44 denotes the longitudinal slot holes in the bottom of the upper tray compartment through which slot holes most of the cat's urine passes onto the liner pad through the special type granular material 16' employed in my previous invention. In FIG. 6 the numeral 100 denotes the cat's fecal matter and numeral 101 denotes the cat's urine.

The above described dome cover or bank cover can be designed to either sit atop conventional litter boxes and/or the waste elimination system box of my prior invention., or be so designed as to be easily attached to same but also easily detached so that the cat's owner can remove the cat's fecal matter whenever he or she so desires.

Cat owners and lovers will not only find the cover to be aesthetically attractive but also of substantial utility in minimizing or eliminating cat odors arising from the cat's natural excretory functions.

The foregoing description and embodiments are intended to illustrate the invention without limiting it thereby. It will be understood that various modifications can be made in the invention without departing from the spirit or scope thereof.

I claim:

1. A waste odor eliminator cover for a cat waste box, said cover being approximately fourteen inches high, twenty inches long and fifteen inches wide and having a substantially flat bottom surface so as to be supported across the top of a cat litter box or a cat waste elimination system, said cover having a top, walls at its sides and at its rear and an entryway at its front for the cat to enter the litter box or elimination system, said sides and rear of the cover having a totality of air slots in same which permit the entry of outside air into the cover near its bottom so as to mix with the odor-laden warm air arising from the cat's excretory functions and to force by convection currents the warm air to rise toward the top of the cover, said top of the cover having charcoal filters and air outlets therein, whereby the odor-laden air is purified as it passes into the room in which the litter box or waste elimination system is placed.

2. A waste odor eliminator cover according to claim 1 wherein the cover also has a top or awning over the entryway to the litter box or cat waste elimination system, said top or awning catching air tending to escape through the entryway and bringing such air back into the main enclosure of the box by a series of openings in the front wall of he cover in the bottom of the awning.

3. A waste odor eliminator cover according to claim 1 wherein the top of the cover is triangular shaped and the charcoal filters and air outlets are on each of the top surfaces of the roof.

4. A waste odor elimination system for cats comprising in combination:
   a. a substantially rectangular waste collection container,
   b a granular material on the bottom of said container; and
   c. a waste odor eliminator cover for the waste container, said cover being approximately fourteen inches high, twenty inches long and fifteen inches wide and having a substantially flat bottom surface so as to be supported across the top of the waste containers, said cover having a top, walls at its sides and at its rear and an entryway at its front for the cat to enter the waste container, said sides and rear of the cover having a totality of air slots in same which permit the entry of outside air into the cover near its bottom so as to mix with the odor-laden warm air arising from the cat's excretory functions and to force by convection contents the warm air to rise toward the top of the cover, said top of the cover having charcoal filters and air outlets therein, whereby the odor-laden air is purified as it passes into the room in which the waste collection container is placed.

5. A waste odor eliminator system according to claim 4 wherein the cover also has a top or awning over the entryway to the waste container, said top or awning catching air tending to escape through the entryway and bringing such air back into the main enclosure of the waste container by a series of openings in the bottom of the awning 6. A waste odor eliminator system according to claim 4 wherein the top of the cover is triangular shaped and the charcoal filters and air outlets are on each of the top surfaces of the roof.

7. A waste odor elimination system for cats comprising in combination:
   a. a substantially rectangular top tray compartment;
   b. a substantially rectangular bottom tray assembly;
   c. a granular material on the bottom of the top tray compartment; and
   d. a waste odor eliminator cover supported across the top surface of the top tray compartment, said cover being approximately fourteen inches high, twenty inches long and fifteen inches wide and having a substantially flat bottom surface so as to be supported across the top surface of the top tray compartment of the waste odor elimination system, said cover having a top, walls at its sides and at its rear and an entryway at its front for the cat to enter the elimination system, said sides and rear of the cover having a totality of air slots in same which permit the entry of outside air into the cover near its bottom so as to mix with the odor-laden warm air arising from the cat's excretory functions and to force by convection currents the war air to rise toward the top of the cover, said top of the cover having charcoal filters and air outlets therein, whereby the odor-laden air is purified as it passes into the room in which the waste odor elimination system is placed.

8. A waste odor elimination system for cats according to claim 7 wherein said top tray compartment is pervious but supports the granular material on its bottom; wherein said top tray compartment possesses numerous elongated holes in its bottom and through which holes and granular material the animal's urine passes, and wherein said bottom tray assembly possesses aeration openings in its sides and in at least one of its ends to assist in evaporation of the cat's urine deposited upon the granular material contained in said top tray compartment.

9. A waste odor elimination system for cats according to claim 8 wherein said top tray compartment possesses a bottom configuration consisting of a multiplicity of V-shaped valleys and inverted V-shaped hills, the bottom of said valleys possessing a multiplicity of longitudinal holes, said bottom capable of supporting the granular material in which the cat waste is to be deposited, the longitudinal holes in the bottom valleys being of sufficient number and size to permit passage therethrough of the cat's urine but also being sufficiently limited in size so as to be capable of supporting most or all of the granular material which is placed atop same without permitting passage through the holes of said bottom valleys.

* * * * *